(12) United States Patent
Lu

(10) Patent No.: US 10,743,515 B2
(45) Date of Patent: Aug. 18, 2020

(54) FOLDABLE AND EXPANDABLE PET CARRIER BAG

(71) Applicant: Xiamen Sunnypet Products Co., Ltd., Xiamen (CN)

(72) Inventor: Kongzhi Lu, Xiamen (CN)

(73) Assignee: XIAMEN SUNNYPET PRODUCTS CO., LTD., Xiamen (CN)

( * ) Notice: Subject to any disclaimer, the term of this patent is extended or adjusted under 35 U.S.C. 154(b) by 381 days.

(21) Appl. No.: 15/880,564

(22) Filed: Jan. 26, 2018

(65) Prior Publication Data

US 2019/0133073 A1     May 9, 2019

(30) Foreign Application Priority Data

Nov. 7, 2017 (CN) .......................... 2017 1 1084734

(51) Int. Cl.
| | |
|---|---|
| *A01K 1/02* | (2006.01) |
| *A45C 7/00* | (2006.01) |
| *A45C 11/00* | (2006.01) |
| *A01K 1/03* | (2006.01) |
| *A01K 1/00* | (2006.01) |

(52) U.S. Cl.
CPC .......... *A01K 1/0254* (2013.01); *A01K 1/0035* (2013.01); *A01K 1/029* (2013.01); *A01K 1/034* (2013.01); *A45C 7/0063* (2013.01); *A45C 11/00* (2013.01)

(58) Field of Classification Search
CPC .. A01K 1/0236; A01K 1/0245; A01K 1/0254; A01K 1/0272; A01K 1/0281; A01K 1/029
See application file for complete search history.

(56) References Cited

U.S. PATENT DOCUMENTS

| | | | | |
|---|---|---|---|---|
| RE25,826 E | * | 8/1965 | Ward .................... | A45C 7/0063 190/108 |
| 5,649,658 A | * | 7/1997 | Hoffman .................... | A45F 3/04 190/2 |
| 5,819,999 A | * | 10/1998 | Tennant .................... | A45F 4/02 224/155 |
| 6,899,057 B1 | * | 5/2005 | Chrisco ................ | A01K 1/0254 119/498 |
| D662,264 S | * | 6/2012 | Chau ........................... | D30/109 |
| 2002/0145018 A1 | * | 10/2002 | Godshaw .................. | A45F 3/04 224/153 |
| 2004/0177814 A1 | * | 9/2004 | Godshaw ............. | A01K 1/0254 119/28.5 |

(Continued)

*Primary Examiner* — Thanh Pham
(74) *Attorney, Agent, or Firm* — Bayramoglu Law Offices LLC

(57) ABSTRACT

A foldable and expandable pet carrier bag. The foldable and expandable pet carrier bag includes a pet carrier bag body, the pet carrier bag body is provided with a first pet door, the pet carrier bag body has a back part, the back part is provided with a foldable expanding part. The expanding part includes a top wall, a bottom wall, a left side wall, a right side wall and a front side wall. The left side wall and the right side wall are folded toward the inner portion of the expanding part, respectively. The bottom wall and the front side wall that overlapped on the surface of the bottom wall are swung and overlapped on the top wall. The pet carrier bag is easy to fold, after being folded, the bottom wall of the expanding part fixed on the pet carrier bag body forms a back cushion.

9 Claims, 5 Drawing Sheets

(56) References Cited

U.S. PATENT DOCUMENTS

| | | | | |
|---|---|---|---|---|
| 2008/0245312 A1* | 10/2008 | Leung | .................. | A01K 1/0245 |
| | | | | 119/497 |
| 2010/0127024 A1* | 5/2010 | Cortes | ...................... | A45C 9/00 |
| | | | | 224/153 |
| 2011/0197822 A1* | 8/2011 | Chou | .................. | A01K 1/0254 |
| | | | | 119/496 |
| 2015/0305297 A1* | 10/2015 | Link | .................... | A01K 1/0245 |
| | | | | 119/474 |

* cited by examiner

FOLDABLE AND EXPANDABLE PET CARRIER BAG

CROSS REFERENCE TO RELATED APPLICATIONS

This application is based upon and claims priority to Chinese Patent Application No. 201711084734.2, filed on Nov. 7, 2017, the entire content of which is incorporated herein by reference.

TECHNICAL FIELD

The present invention relates to the field of pet appliances, and more particularly to a pet carrier bag that can be folded and expanded.

BACKGROUND

With the improvement in people's living standards, in order to eliminate loneliness, provide entertainment and other spiritual needs, family pets have become more and more popular. Pet owners usually use a pull rope to pull the pets when walking the pets, but if the pet owner is travelling or is in a rush while the pet is not walking fast, then pet-carrying bags for the convenience of carrying pets is used. The pet carrier bags came into being. A common pet carrier bag usually includes a bag body, a zipper door and a plurality of vents arranged on the bag body, and the pet enters and exits through the zipper door.

The existing pet carrier bags usually have small sizes for easy portability and collection. However, in order to increase the pet's activity space, the approach of many pet carrier bag manufacturers is to add a zipper on the side of the bag body, the two chains of the zipper are staggered at a certain distance. The bag body is expanded when the zipper is opened, and the bag body is contracted when the zipper is closed. However, the structure of the pet carrier bags, due to the restriction of the cloth between the zipper teeth, the expansion space is extremely limited. At the same time, the bottom of the expansion part of pet carrier bag has no support, many pets will be too frightened to move in the space of expansion part, so the expansion space is useless.

SUMMARY

The present invention provides a foldable and expandable pet carrier bag, so as to solve the problems that the existing pet carrier bags have very limited expansion and contraction space, and the bottom of the expanded space has no supporting force and are inconvenient to use and other defects.

The present invention adopts the following technical solutions:

A foldable and expandable pet carrier bag, includes a pet carrier bag body, the pet carrier bag body is provided with a first pet door, the backside of the pet carrier bag body is provided with a foldable expanding part; when the expanding part is expanded, a cuboid or approximate cuboid structure is formed; the expanding part comprises a top wall, a bottom wall, a left side wall, a right side wall and a front side wall; both of the left side wall and the right side wall are made of a foldable material, the front side wall and the backside are symmetrically arranged; each of the outer circumferences of the front side wall and the top wall is provided with a support ring; a connecting piece which is detachably fixed on the pet carrier bag body is provided on the bottom wall; when the pet carrier bag is folded, the front side wall and the top wall are rotated downward and overlapped with the bottom wall and the backside respectively; the left side wall and the right side wall are folded toward an inner portion of the expanding part, respectively; the bottom wall and the front side wall that overlapped on a surface of the bottom wall are swung upward and overlapped on the top wall of a surface of the backside.

Further, the backside is composed of a cloth, the bottom surface of the cloth is fixedly connected to the pet carrier bag body, and the other part of the cloth is connected to the inner wall of the pet carrier bag body through a zipper.

Further, a pad body is arranged on the side of the cloth facing the inside of the pet carrier bag body, when the zipper of the backside is pulled open and the pad body is overlapped on the bottom wall of the expanding part, the pad body forms a pet pad of the expanding part.

Further, one side of the bottom wall is fixedly connected to the side of the bottom of the pet carrier bag body, and the connecting piece is zipper, one teeth chain of the zipper is provided on the other three sides of the bottom wall, another teeth chain is correspondingly arranged on the pet carrier bag body outside the backside.

Further, the front side wall is provided with a second pet door, the second pet door is connected to the front side wall through the zipper.

Further, the left side wall and the right side wall are both mesh fabrics, and the outer periphery of the mesh fabric is provided with a flat fiber.

Further, the outlines between the support rings are formed by connection of the elastic soft fabric or the mesh-like fabric.

Further, the bottom wall is composed of a hard bottom plate and a cloth wrapped on the outer surface of the hard bottom plate, and the outer surface of the cloth on the bottom of the hard bottom plate is also provided with a breathable back cushion adapted to fit on the back of the human body.

Further, the pet carrier bag further comprises a thin pad whose size is fit with the bottom wall, the thin pad is detachably connected to the bottom wall by a Hook-and-loop fastener; and a storage bag is provided in the pet carrier bag body for storing the thin pad.

It can be seen from the above description of the structure of the present invention that, compared with the prior art, the present invention has the following advantages:

1. The pet carrier bag of the present invention is provided with an expanding part on the backside of the pet carrier bag body, and has a support ring on the top wall and the front side wall of the expanding part, forming a cuboid or an approximate cuboid structure when extended, with a large expansion volume and a solid structure. When folding the pet carrier bag, the top wall is downwardly rotated and folded on the back part of the pet carrier bag body, the front side wall is downwardly rotated and folded on the bottom wall, the left side and right side walls are respectively folded into the inner portion of the expanding part, and then, the bottom wall and the front side wall overlapped on the surface of the back wall are swung upward to overlap on the top wall of the surface of the backside, and finally, fixed on the pet carrier bag body through the connecting piece, the folding of the pet carrier bag is simple and convenient. After being folded, a back cushion is formed on the bottom wall of the expanding part, the expanding part is fixed on the pet carrier bag body.

2. The backside of the pet carrier bag body is connected to the inner walls of the pet carrier bag body by a zipper, and can be opened or closed to meet the requirements of different occasions; the backside is provided with a cushion body on the side facing the pet carrier bag body; when the zipper on the backside is pulled open and folded over the bottom wall of the expanding part, the entire backside can form a pet pad structure.

DETAILED DESCRIPTION OF THE INVENTION

Specific embodiments of the present invention will be described with reference to the accompanying drawings as below.

Figure 1:
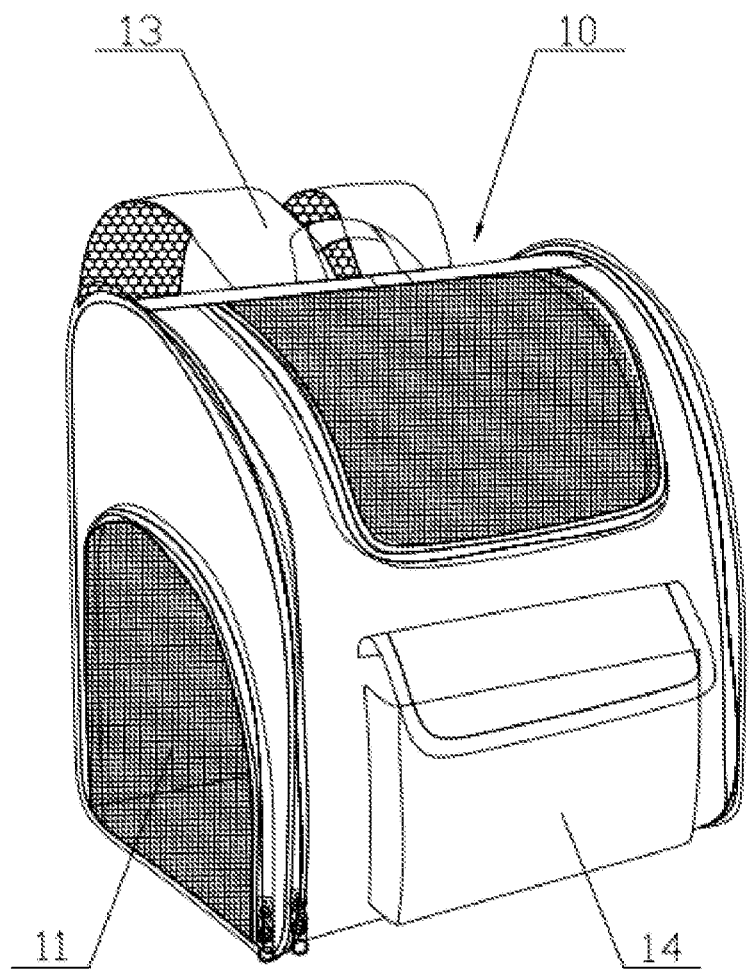
FIG. 1 is a first structural schematic view of the expanding part in folded state according to the present invention.

A foldable and expandable pet carrier bag, referring to FIG. 1, includes a pet pack body 10, a front portion and a top portion of the pet carrier bag body 10 and are integrally formed by a cloth to form an arc structure. At least one side of the two sides of the arc structure is connected with a side part by a zipper. The edge of the side part is made of a hard material, and the side part forms a first pet door 11. A pet pad is also arranged at the bottom of the pet carrier bag body 10 (for angle reasons, the pet pad is not shown in the figure).

Referring to FIGS. 2 to 5, the pet carrier bag body 10 further includes a backside 12. Straps 13 are connected to the upper and lower ends of the backside 12. The backside 12 of the pet carrier bag body 10 is provided with a foldable expanding part 20. When the expanding part 20 is expanded, the expanding part forms a cuboid or a substantially cuboid structure. The expanding part 20 includes a top wall 21, a bottom wall 22, a left side wall 23, a right side wall 24 and a front side wall 25. Both of the left side wall 23 and the right side wall 24 are made of a foldable material, the front side wall 25 is disposed opposite to the backside 12 a. That is, the front side wall 25 and the backside are symmetrically arranged. Each of outer circumferences of the front side wall 25 and the top wall 21 is provided with a support ring 251. A connecting piece 221 which is detachably fixed on the pet carrier bag body 10 is provided in the bottom wall 22. Preferably, the connecting piece is a zipper, one side of the bottom wall 22 is fixedly connected to the side of the bottom of the pet carrier bag body 10, one teeth chain of the zipper is provided on the other three sides of the bottom wall 22, another teeth chain is correspondingly arranged on the pet carrier bag body 10 outside the backside 12.

When folding the expanding part 20, the front side wall 25 and the top wall 21 are rotated downward to overlap on the bottom wall 22 and the backside 12, respectively, and the left side wall 23 and the right side wall 24 form an approximately right-angled triangle structure (Refer to FIG. 4), respectively. In this state, the pet pad in the pet carrier bag body is pulled out to place and overlap with the top surface of the front side wall 25 of the bottom wall 22, to form a small balcony for the pet basking in the sunshine. And then, the left side wall 23 and the right side wall 24 continue to be folded inside the expanding part 20 respectively, and the bottom wall 22 and the front side wall 25, overlapped on the surface of the bottom wall 22, are swung upward to overlap on the top wall 21 of the surface of the backside 12. Finally, the connecting piece 221 is fixedly connected to the pet carrier bag body 10.

The left side wall 23 and the right side wall 24 both are mesh fabrics, and the outer periphery of the mesh fabric is provided with a flat fiber. The outlines between the support rings 251 are formed by connection of the elastic soft fabric or the mesh-like fabric.

Figure 3:
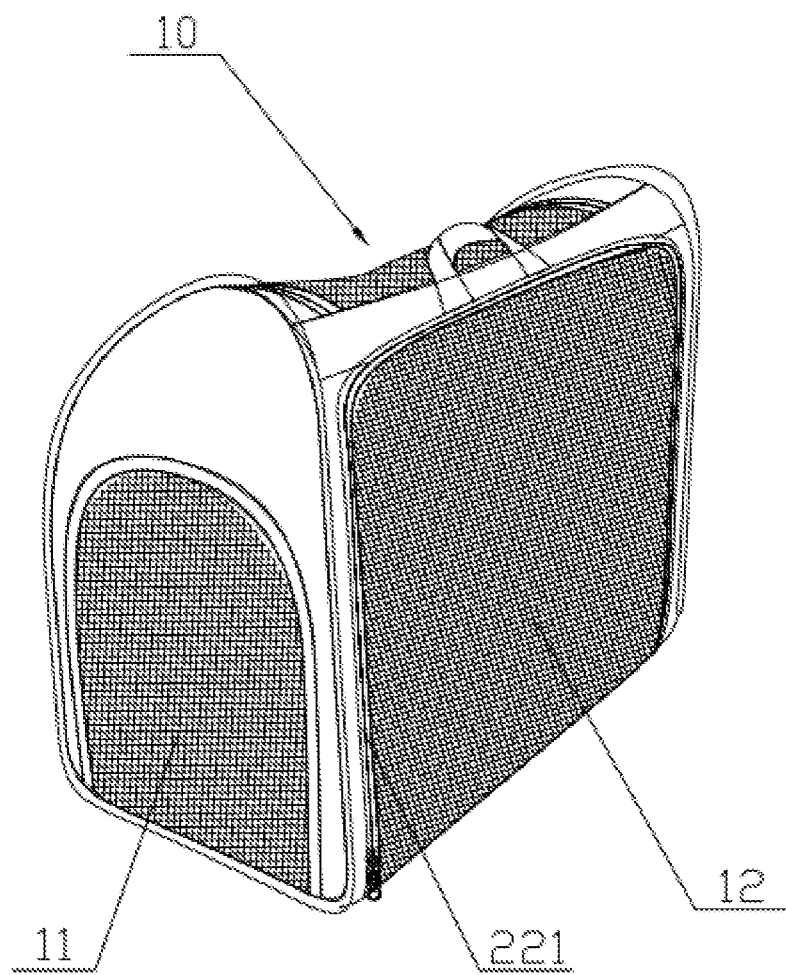
FIG. 3 is a structural schematic view showing the present invention omitted the expansion part.
Figure 4:
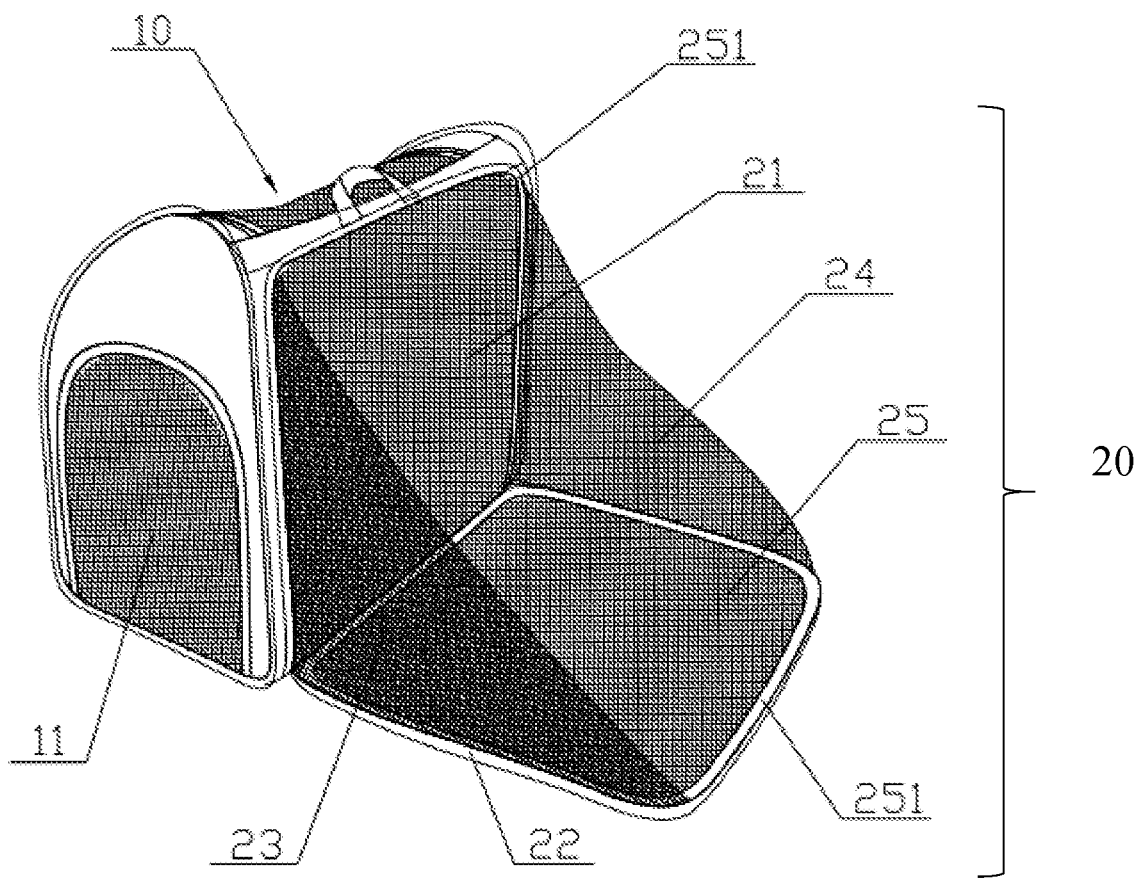
FIG. 4 is a structural schematic view showing the top wall and the front side wall of the expanding portion in downward folded state according to the present invention.

Referring to FIG. 3, the backside 12 is made of a cloth, a bottom of the cloth is fixedly connected to the pet carrier bag body 10, and the other portion of the cloth is connected to the inner wall of the pet carrier bag body 10 through a zipper. A pad body is arranged on the side of the backside facing the inner portion of the pet carrier bag body 10 (for angle reasons, the pad body is not shown in the FIG. 3), when the zipper of the backside 12 is pulled open, and the bottom wall 22 overlapped on the expanding part 20, the pad body forms a pet pad of the expanding part 20.

Figure 2:
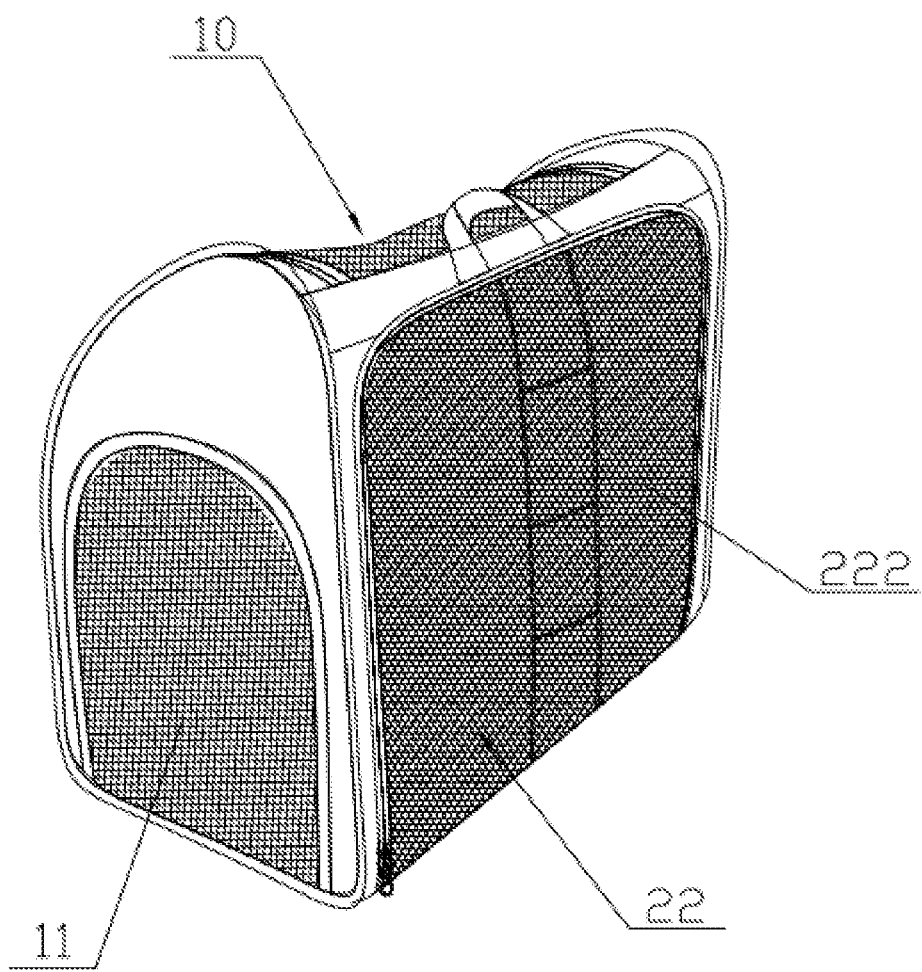
FIG. 2 is a second structural schematic view of the expanding part in folded state according to the present invention.

Referring to FIG. 2, the bottom wall 22 is composed of a hard bottom plate and a cloth wrapped on the outer surface of the hard bottom plate, and the outer surface of the cloth on the bottom of the hard bottom plate is also provided with a breathable back cushion 222 adapted to fit on the back of the human body. The pet carrier bag further includes thin pad whose size is fit with the bottom wall (not shown in the figures), the thin pad is detachably connected to the bottom wall by a Hook-and-loop fastener to avoid soiling the bottom surface of the bottom wall when the expanding part 20 is expanded. Further, a storage bag 14 is provided in the pet carrier bag body 10 for storing the thin pad.

Figure 5:
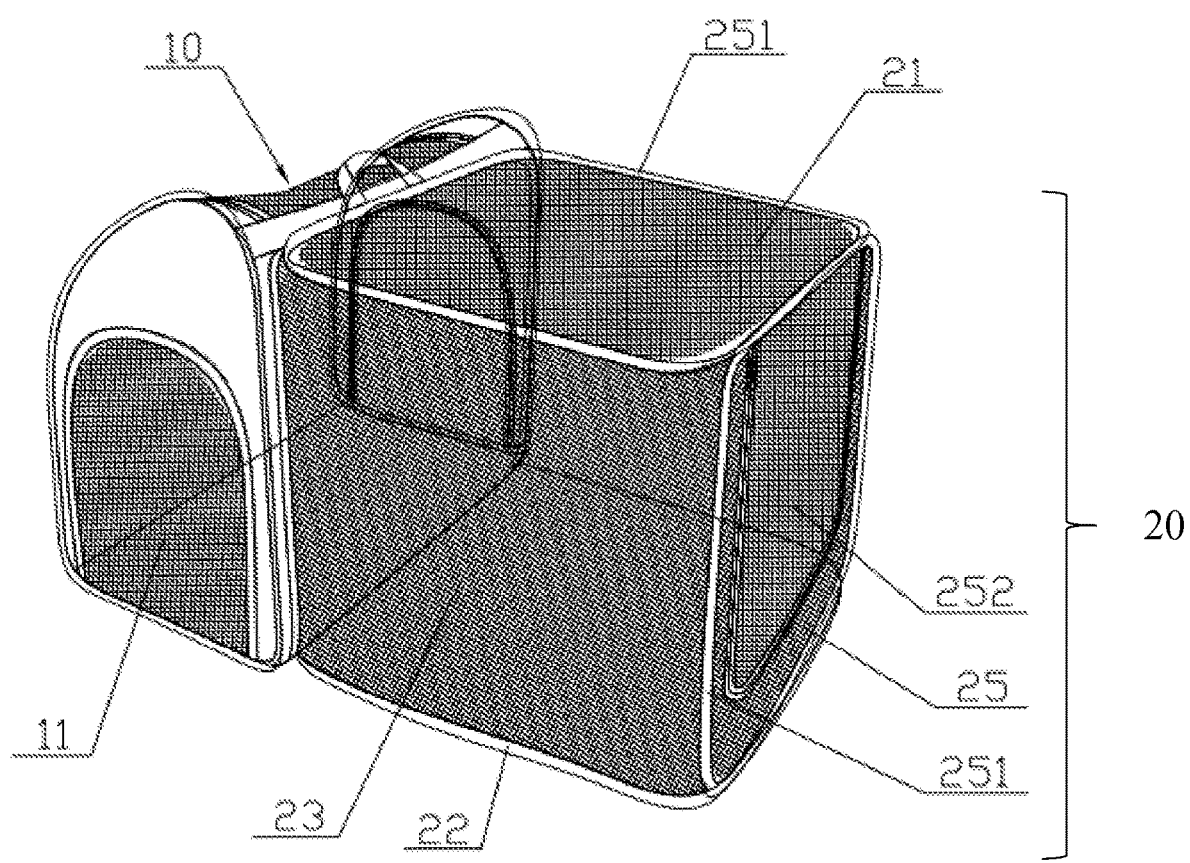
FIG. 5 is a structural schematic view of an expanding part in expanded state according to the present invention.

Referring to FIG. 5, a second pet door 252 is provided on the front side wall 25, and the second pet door 252 is connected to the front side wall 25 by a zipper.

The above description describes only the specific embodiments of the present invention, but the design concept of the present invention is not limited thereto. Any insubstantial modifications to the present invention made using the conception should fall within the scope of the present invention.

What is claimed is:

1. A foldable and expandable pet carrier bag, comprising a pet carrier bag body, wherein the pet carrier bag body is provided with a first pet door and a backside, the backside is provided with a foldable expanding part; when the expanding part is expanded, the expanding part forms a cuboid or a substantially cuboid structure; the expanding part comprises a top wall, a bottom wall, a left side wall, a right side wall and a front side wall; both the left side wall and the right side wall are made of a foldable material, the front side wall and the backside are symmetrically arranged; the front side wall comprises a first circumference and the top wall comprises a second circumference, the first circumference is provided with a first support ring, and the second circumference is provided with a second support ring; a connecting piece detachably fixed on the pet carrier bag body is provided in the bottom wall; when the pet carrier bag is folded, the front side wall and the top wall are rotated downward and overlapped on the bottom wall and the backside respectively; the left side wall and the right side wall are folded towards an inner portion of the expanding part respectively; the bottom wall and the front side wall that overlapped on a surface of the bottom wall are swung upward and overlap on the top wall of a surface of the backsides;

wherein in a partially folded state, when folding the expanding part, the front side wall and the top wall are rotated downward to overlap on the bottom wall and the backside, respectively, and the left side wall and the right side wall each forms an approximately right-angled triangle structure, and in the partially folded state, a pet pad in the pet carrier bag body is pulled out to place and overlap with a top surface of the front side wall of the bottom wall, to form a small balcony; and wherein in a fully folded state, the approximately right-angled triangles are folded inside the expanding part, respectively, and the bottom wall and the front side wall, overlapped on the surface of the bottom wall, are swung upward to overlap on the top wall of the surface of the backside, and the connecting piece is fixedly connected to the pet carrier bag body.

2. The foldable and expandable pet carrier bag according to claim 1, wherein the backside is formed of a cloth, the cloth comprises a bottom and a remaining portion except the bottom, the bottom of the cloth is fixedly connected to the pet carrier bag body, the remaining portion of the cloth is connected to an inner wall of the pet carrier bag body through a zipper.

3. The foldable and extendable pet carrier bag according to claim 2, wherein a pad body is arranged on a side of the cloth facing an inside of the pet carrier bag body, when the zipper of the backside is pulled open and the pad body is overlapped on the bottom wall of the expanding part, the pad body forms the pet pad of the expanding part.

4. The foldable and extendable pet carrier bag according to claim 1, wherein the pet carrier bag body comprises a bottom, the bottom wall comprises a first side, a second side, a third side and a fourth side, the first side of the bottom wall is fixedly connected to a side of the bottom of the pet carrier bag body, and the connecting piece is a zipper, and the zipper comprises a first teeth chain and a second teeth chain, the first teeth chain of the zipper is provided on the second side, the third side and the fourth side of the bottom wall, the second teeth chain is correspondingly arranged in the pet carrier bag body outside the back side.

5. The foldable and extendable pet carrier bag according to claim 1, wherein the front side wall is provided with a second pet door, the second pet door is connected to the front side wall through a zipper.

6. The foldable and extendable pet carrier bag according to claim 1, wherein the left side wall and the right side wall are both made of a mesh fabric, and the outer periphery of the mesh fabric is provided with a flat fiber.

7. The foldable and extendable pet carrier bag according to claim 1, wherein a plurality of outlines between the first support ring and the second support ring are formed by connection of an elastic soft fabric or a mesh-like fabric.

8. The foldable and expandable pet carrier bag according to claim 1, wherein the bottom wall includes a hard bottom plate and a cloth wrapped on an outer surface of the hard bottom plate, and an outer surface of the cloth on the bottom of the hard bottom plate is provided with a breathable back cushion adapted to fit on the back of the human body.

9. The foldable and expandable pet carrier bag according to claim 1, wherein the pet carrier bag further comprises a thin pad fit with the bottom wall, the thin pad is detachably connected to the bottom wall by a Hook-and-loop fastener; further, a storage bag is provided in the pet carrier bag body for storing the thin pad.

* * * * *